3,295,796
FLIGHT CONTROL SYSTEM
Randall Gaylor, Phoenix, Ariz., assignor to Sperry Rand Corporation, Great Neck, N.Y., a corporation of Delaware
Filed Apr. 3, 1964, Ser. No. 357,071
6 Claims. (Cl. 244—77)

This invention relates in general to aircraft autopilots, and more particularly to improvements in aircraft landing and control systems.

Present practice in landing an aircraft by means of the instrument landing system (ILS) is to memorize a signal, usually one representing the craft rate of descent, while the craft is flown along the radio defined ILS course; then, when the craft is so near the ground that radio control becomes unreliable (because of signal noise and the narrowness of the wedge-shaped ILS radio beam), the craft is placed under the control of the memorized signal, whereby the craft continues along a straight line descent toward the ground. This latter control phase, which has in the prior art been termed the "glide slope extension phase" (being described in U.S. Patents 3,052,427, 3,115,319, and 2,987,275) is where the present improvement technique resides.

For a glide slope extension which is truly collinear with the glide path defined by the ILS, two requirements must be met by the control system: first, the memorized rate of descent signal must be continually updated to represent correctly the craft rate of descent at the switch-over or transition point, and second, once control has been switched over to the extension phase, effects of wind variations with respect to the aircraft must be continually compensated for. With the first requirement properly met, the need for the second requirement increases, the reason being that were a sporadic wind to occur say at or near the transition point to cause the memorized descent rate to change abruptly, compensation for this sporadically-seen change in descent rate would be needed (as such sporadic wind died down) for the craft to continue its straight line course.

Another factor heretofore unmentioned but importantly compensated for by the invention is that of "wind shear," i.e. the phenomenon whereby even for a steady wind the different layers of the air mass in the vicinity of the runway have respective air speed which decrease as a direct function of altitude. By employing a memorized descent rate signal as in the prior art to maintain the ILS defined course in the presence of wind shear effects, the craft is forced to fly undesirably a curved path toward the ground, i.e. since the ILS defined course makes an angle $\gamma = h/v$ with respect to the earth, changes in craft ground speed $v$ (due to wind shear) must be met by corresponding changes in the craft descent rate to keep the angle $\gamma$ constant and the extension phase collinear with the glide slope phase; otherwise, the craft flies a curved path to its flare-out altitude. It is in providing corresponding descent rate changes for wind variations that the invention pertains, i.e. the invention provides for the continual modification of the descent rate signal to be memorized thereby to vary appropriately the actual descent rate of the craft and thereby keep the path angle $\gamma$ of the craft constant.

A principal object of the invention is to provide an improvement for use in automatic landing control systems for aircraft.

Another object of the invention is to provide apparatus for improving glide slope extension systems to compensate for sensed air speed variations.

Another object of the invention is to provide apparatus for improving the ability of a craft to fly automatically along a straight line path to an altitude at which the craft initiates a flare-out maneuver.

The invention will be described with reference to the figures wherein.

Figure 1:
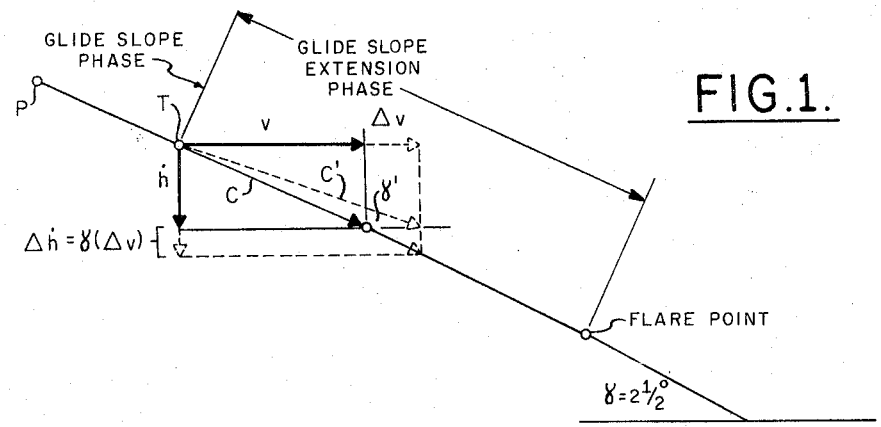
FIGS. 1 and 2 are diagrams useful in describing the invention.

Referring to FIG. 1, an aircraft, at a point P and descending, e.g. under control of the ILS, along a radio defined course that makes 2½ degree angle $\gamma$ with respect to the surface of the earth, has two components of its speed vector C along the defined course, to wit, a ground speed component $v$ and a rate of descent component $h$. By memorizing a signal representing the craft descent rate component $h$ prior to the craft reaching a transition point T, the craft (as in the prior art) after it passes the point T may be made to continue, in the absence of wind changes, along (glide slope extension) a course collinear with the ILS defined course, this being by simply equating a signal representing the instantaneous descent rate to the memorized descent rate signal and applying the error signal produced thereby to the craft pitch channel. So long then as ground speed ideally remains constant the former course is continued.

Figure 2:
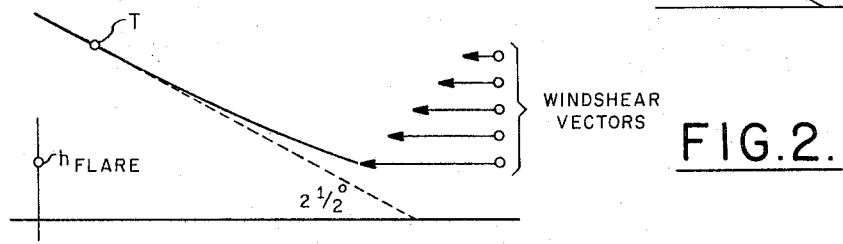

As is usually the case though, the speed $v$ of the craft is subject to many changes, whether caused by sporadic winds or by the aforementioned wind shear effect, which effect and how it alters the actual path of the craft is graphically depicted in FIG. 2. When air speed changes, the craft under control of a prior art glide slope extension system will pitch up or down and therefore depart the desired course as shown, for example, by course C' of FIG. 1. That is, since the memorized descent rate $h$ is forced in the prior art to be constant while ground speed $v$ is free to change, for example to $v + \Delta v$, the craft undesirably assumes a new path angle $\gamma'$.

To assure that the craft flies a glide slope extension collinear with the 2½ degree ILS defined course, its path angle $\gamma$ must continue to be held at 2½ degrees, such being possible only if the craft descent rate $h$ increases by $\Delta h$ when the craft ground speed $v$ increases by $\Delta v$, and vice versa. In other words, if the memorized (i.e. the commanded) descent rate signal $h$ is modified continually by a signal $\Delta h$ varying as a direct function of ground speed, the aforedescribed objects will be achieved.

In determining the magnitude of the modifying signal $\Delta h$ in terms of ground speed, reference should be had to the following derivation: The path angle $\gamma$, which it is desirable to be held constant, must equal both $h/v$ and $h + \Delta h / v + \Delta v$, i.e.

$$\frac{h}{v} = \frac{h + \Delta h}{v + \Delta v} \tag{1}$$

$$\Delta h = \frac{h(v + \Delta v)}{v} - h = \frac{h}{v}(v + \Delta v) - \frac{h}{v} v \tag{2}$$

Substituting $\gamma$ for $h/v$ $$\Delta h = \gamma(v + \Delta v) - \gamma v = \gamma(\Delta v) \tag{3}$$

Figure 3:
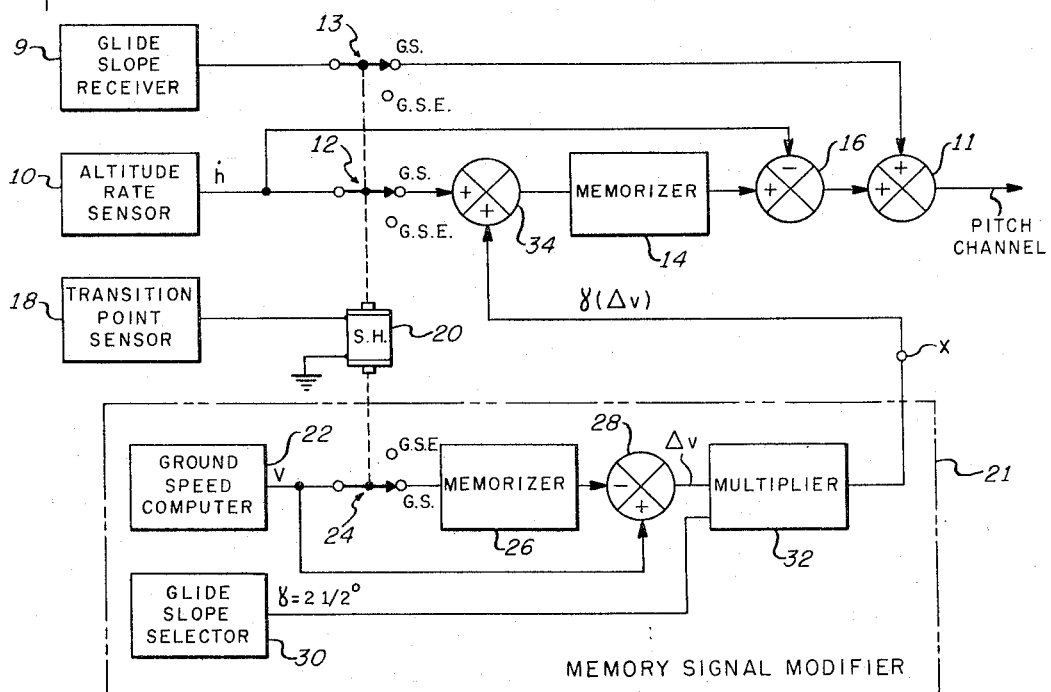
FIG. 3 is a block diagram of a circuit embodying the invention.

Referring now to FIG. 3, the following described circuit constitutes the prior art on which the invention improves: A glide slope receiver 9 applies its control output signal through a summing circuit 11 to the craft pitch channel to keep the craft on the ILS defined course so long as a switch 13 is kept in its normally closed position, this being so long as the craft is for example at an altitude higher than that associated with the transition point T of FIG. 1. An altitude rate sensor 10, which may be like the combination of circuit elements 1 and 5 of U.S. Patent 2,841,345, produces a signal $\dot{h}$ representing the craft rate of descent and applies such signal through a normally closed switch 12 to a memory circuit 14. The memory circuit 14 may for example comprise a potentiometer the wiper of which is servo driven or it may instead comprise a simple integrating RC circuit. The signal memorized by the circuit 14 is applied then to a comparison circuit 16 adapted to receive also the signal $\dot{h}$ from the sensor 10. So long as the switch 12 remains closed, i.e. during the glide slope (G.S.) phase of the landing maneuver, the comparison circuit 16 will generally have a zero output error signal. At the transition point T of the landing glide, a sensor 18 applies a signal to a self-holding relay 20 which opens the switches 12 and 13 to commence the glide slope extension (G.S.E.) phase of the landing maneuver. The transition point sensor 18 may be like the circuit 20 of U.S. Patent 3,115,319. Once the switch 12 opens, control error signals get applied from the comparison circuit 16 to control the craft so that it flies at its former rate of descent.

*The invention.*—A ground speed computer 22 producing a signal $v$ applies its output signal through a normally closed switch 24 (which switch is ganged with the switches 12 and 13) to a memory circuit 26; the circuit 26 may be like the memory circuit 14. The memory circuit 26 output signal is applied to a comparison circuit 28 adapted to receive also the signal $v$ from the computer 22. So long as the switch 24 remains closed, i.e. during the glide slope phase (G.S.) of the landing maneuver, the comparison circuit 28 has substantially a zero output signal. At the transition point T, however, i.e. where the craft assumes the glide slope extension phase (G.S.E.) of the landing maneuver, the switch 24 opens, after which time a signal $\Delta v$ appears at the output of the comparison circuit 28 whenever the craft ground speed changes from that had at the transition point T. A glide slope selector 30, which may be a simple potentiometer, produces a signal $\gamma$ representing the angle that the ILS defined glide slope makes at the runway, such signal $\gamma$ and the error output signal, $\Delta v$ from the circuit 28 being applied to a multiplying circuit 32. The multiplying circuit 32 then produces and applies its output product signal $\gamma$ ($\Delta v$), which signal is necessary to modify the signal stored by the memory circuit 14, to a summing circuit 34, whereby the resultant output signal from the summing circuit 34 gets stored by the memory circuit 14 and causes the craft to fly a continuous straight line descent even in the presence of varied wind conditions.

An aspect of the invetion which has little to do with glide slope extensions per se is that even with the craft under ILS radio control the circuit of the present invention assists such radio control so that the craft may more easily fly the glide slope phase of the landing maneuver. That is, blustery wind conditions during the glide slope phase will cause the craft periodically to depart from the ILS defined course as the craft losses and gains lift, a second order effect caused by first order air speed changes. By modifying the signal stored by the memorizer 14 even before the craft rate of descent and the signal stored by the memorizer 26 have had a chance to change, anticipation, i.e. correction for an adverse condition as it occurs, gets built into the landing system.

Figure 4:
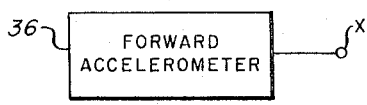
FIG. 4 shows a component block, substitution of which into the circuit of FIG. 3 provides a presently preferred form of the invention.

Since most landing glide angles $\gamma$ are approximately 2½ degrees, and since the memory circuit 14 is in essence an integrating circuit, the memory signal modifier circuit, depicted generally by means of dashed lines 21 on FIG. 3, may be supplanted by the component 36 of FIG. 4, which component provides a signal representing the forward, i.e. fore-and-aft acceleration $dv/dt$ of the craft when, and only when, the craft experiences speed changes. By applying the signal $dv/dt$ through the summing circuit 34 to the memory circuit 14 (and suitably adjusting the gain of the memory circuit to accommodate for the constant signal $\gamma$), the memory circuit will not only integrate the signal $dv/dt$ to provide a signal $\Delta v$, but will also store such signal and thereby modify the signal against which the craft descent rate signal $\dot{h}$ is compared, such signal modification being desirably as a function of ground speed changes. Hence, all of the features provided by the apparatus of FIG. 3 are provided, and these in a simple way.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft landing control system of the type wherein a signal representing the craft rate of descent is memorized while said craft is controlled to maintain a radio defined course, said signal being compared below a transition point with a signal representing the instantaneous craft descent rate to produce an error signal for controlling the craft to fly a collinear extension of the radio defined course after said radio control is removed, apparatus comprising means for producing an error signal proportional to changes in the ground speed of the craft with respect to the ground speed had at said transition point, and means for modifying the memorized rate of descent signal in accordance with said ground speed error signal.

2. Glide slope extension control apparatus for aircraft comprising means for producing a signal representing craft rate of descent, means for storing said signal while said craft is controlled to a radio defined course, means for producing a signal representing ground speed changes with respect to quiescent ground speed condition, means for modifying the signal in said storing means as a function of said ground speed signal, and means for comparing said descent rate signal with the output of said storing means to produce an error signal for controlling the flight of said craft.

3. The apparatus of claim 2 wherein said means for producing a signal representing ground speed changes comprises means for producing a signal proportional to fore-and-aft accelerations of the craft.

4. Aircraft landing control apparatus comprising radio means for controlling the flight of a craft to a predetermined altitude, means for producing a signal proportional to the rate at which craft barometric pressure changes, means for memorizing said barometric pressure rate signal, means for producing a signal proportional to craft ground speed changes relative to a quiescent ground speed, means for increasing and decreasing the signal supplied to said memorizing means in proportion to the magnitude of said ground speed change signal when ground speed respectively increases and decreases, means for receiving said memorized signal and said barometric pressure rate signal to produce a control signal in proportion to the error therebetween, and means for applying said control signal to control the flight of said craft when said craft is below said predetermined altitude.

5. The apparatus of claim 4 wherein said means for producing a signal representing ground speed changes comprises means for producing a signal proportional to fore-and-aft accelerations of the craft.

6. Aircraft landing control apparatus comprising means for controlling the craft to follow a radio defined glide slope to a predetermined transition altitude, altitude responsive means for providing a signal proportional to the rate of change of altitude of said craft, means for memorizing said altitude rate signal above said transition altitude whereby to provide a reference rate of descent for use below said transition altitude, means operable upon reaching said transition altitude for thereafter controlling said craft in accordance with said altitude rate and reference altitude rate signals, means for providing a signal which varies in accordance with the fore-and-aft acceleration of said craft, and means responsive to said last-mentioned means for modifying the signal in said memorizing means to thereby modify said reference altitude rate signal in accordance with craft fore-and-aft accelerations whereby to compensate for external disturbances tending to vary the actual rate of descent of said craft.

References Cited by the Examiner

UNITED STATES PATENTS 2,987,275  6/1961  Moncrieff-Yeates et al. _ 244—77
3,147,424  9/1964  Miller _____ 244—77

FERGUS S. MIDDLETON, *Primary Examiner.*